United States Patent [19]

Slane et al.

[11] 4,041,470
[45] Aug. 9, 1977

[54] FAULT MONITORING AND REPORTING SYSTEM FOR TRAINS

[75] Inventors: Francis L. Slane, Lancaster; Truman L. Allison, York, both of Pa.

[73] Assignee: Industrial Solid State Controls, Inc., York, Pa.

[21] Appl. No.: 649,678

[22] Filed: Jan. 16, 1976

[51] Int. Cl.² .................. B60L 3/00; G06F 3/04; G06F 11/06; G06F 15/50
[52] U.S. Cl. .................. 364/900; 307/9; 235/150.2; 340/52 R
[58] Field of Search .......... 340/172.5, 146.1 C, 340/48, 52 R; 235/150.2; 307/9; 246/34 R, 167 R, 169 R; 445/1

[56] References Cited

U.S. PATENT DOCUMENTS

| | | | |
|---|---|---|---|
| 3,575,604 | 4/1971 | Smith | 307/9 |
| 3,696,758 | 10/1972 | Godinez, Jr. | 340/48 X |
| 3,836,768 | 9/1974 | Clarke et al. | 340/172.5 X |
| 3,838,272 | 9/1974 | Bull | 246/169 R |

*Primary Examiner*—Melvin B. Chapnick
*Attorney, Agent, or Firm*—Roylance, Abrams, Berdo & Kaul

[57] ABSTRACT

A train monitoring and reporting system in which each car of a multi-car train is provided with sensors to monitor brake, door, motor and other functions. A controller in each car sequentially and repetitively reviews the condition of each sensed function and evaluates the conditions to determine whether a fault condition exists. The evaluation result is stored and the review is continued and repeated. The lead car of the train repetitively and sequentially interrogates the storage units in each car for each type of fault condition, stores the responses to the interrogation and displays to the motorman any faults reported. The cars communicate through a multiplex data link system which connects the cars in series in a multiplex current loop. The number of times each fault occurs is counted, the count being then available for readout by maintenance personnel.

8 Claims, 7 Drawing Figures

FAULT MONITORING AND REPORTING SYSTEM FOR TRAINS

This invention relates to a communication system and, more particularly, to a system for surveillance and monitoring of selected functions in a multi-car vehicle such as a railroad train.

BACKGROUND OF THE INVENTION

In recent years, various systems have been devised for monitoring functions and controlling functions on the various cars assembled into a railroad train of the intercity as well as intracity variety. These systems have been designed to perform various special functions, generally including, for example, interrelated control of multiple locomotives, monitoring of various critical operating parameters on the various cars of a train, and communication between various cars to permit some degree of monitoring, in the lead or drive vehicle of the train, the critical functions which can affect train operation or which involve safe operation of the train.

Numerous patents have issued to systems of these general types, including systems in which multiplex communication between cars is employed, and examples of these include the following patents:

|           |           |
|-----------|-----------|
| 3,336,577 | 3,601,806 |
| 3,482,089 | 3,622,994 |
| 3,516,063 | 3,828,313 |
| 3,575,604 | 3,882,465 |

While this is by no means an exhaustive list of the art in this field, these patents represent and constitute examples of the development which has occurred.

BRIEF SUMMARY OF THE INVENTION

It is an object of the present invention to provide a function monitoring system usable on the cars of a multiple-car vehicle, which system provides a significant improvement in flexibility of application and standardization of equipment for trains of varying types.

A further object is to provide a train monitoring and control system which is capable of providing continuous monitoring of functions in each car and substantially continuous monitoring and display functions of interest in all cars at a selected location.

Another object is to provide a system which is capable of producing and maintaining a record of failures in selected train functions to improve maintenance and repair operations.

Briefly described, the invention comprises a monitoring and reporting system for use on a vehicle having a plurality of interconnected cars including a lead car and at least one other car, comprising sensor means in each of the cars for monitoring a plurality of physical conditions in the cars and for altering circuit conditions to represent the state of the physical conditions, means in each of the cars connected to the sensor means in the same car for repetitively and sequentially detecting each of the circuit conditions and for producing a digital signal having a value representative of the state of each physical condition, means for evaluating the digital signals in accordance with predetermined criteria to produce and repetitively update a set of second digital signals having values representative of the existence or nonexistence of fault conditions, memory means for storing the set of second digital signals, circuit means interconnecting the cars for transmission of digital signals, logic means in the lead car for repetitively and sequentially sending interrogation signals individually to the memory means in each of the cars, including the lead car, to determine the existence of faults, means in each of the cars responsive to the interrogation signals for transmitting status signals representative of the second digital signals to the lead car to provide fault information to the lead car, and display means in the lead car for receiving and storing the status signals and for providing a visual display of fault conditions reported in those signals.

In order that the manner in which the foregoing and other objects are attained in accordance with the invention can be understood in detail, particularly advantageous embodiments thereof will be described with reference to the accompanying drawings, which form a part of this specification, and wherein.

Figure 1:
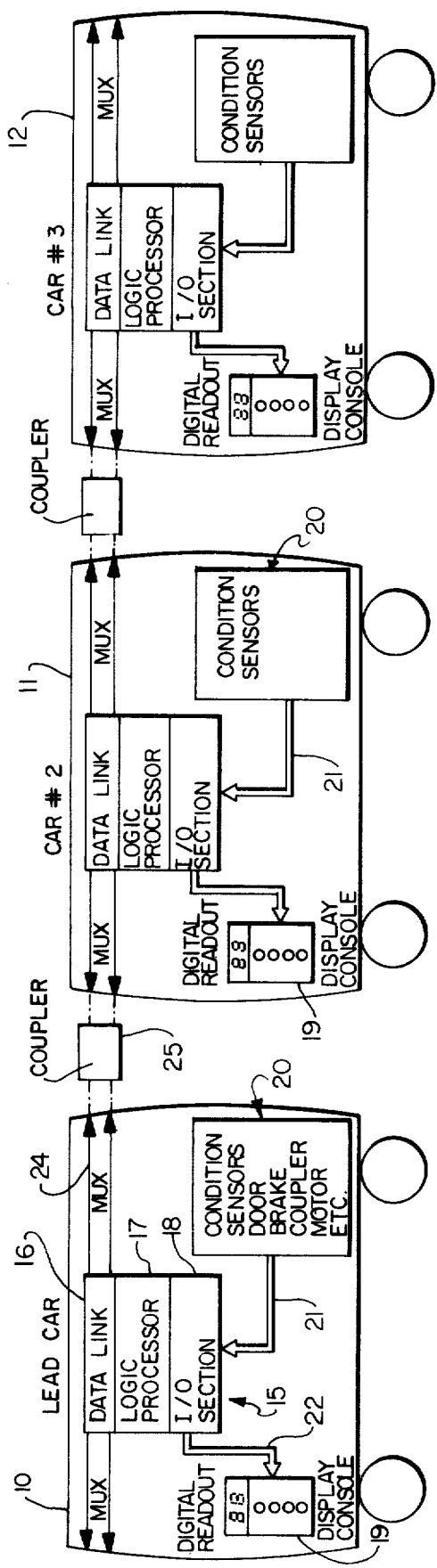
FIG. 1 is a schematic diagram of a multi-car train incorporating a system according to the present invention.

FIG. 1 shows a multiple-car train, in very simplified form, with an indication of the nature of the equipment installed on each car in accordance with a system of the present invention. In FIG. 1 there is shown a lead car 10 and additional cars 11 and 12 which will, for purposes of the present explanation, be regarded as car Nos. 2 and 3 of a three-car train. It will be recognized, of course, that a smaller or somewhat larger number of cars can be used in a system incorporating the present invention and that the general nature of the system will not deviate from the equipment existing in this example. Indeed, it is a particular advantage of the system disclosed herein that no equipment modification is required in order to add cars. Furthermore, cars 10, 11 and 12 can easily be cars of different types without any fundamental modification to the equipment.

In each car, there is a main processing unit indicated generally at 15 which includes a data link portion 16, a processor portion 17, and an input-output section 18, abbreviated "I/O". In addition, there is a digital readout and display console 19 and a group of condition sensors indicated schematically by box 20. It will be recognized in connection with these sensors that they do not and probably never would constitute a single unit as depicted in FIG. 1, but would constitute a plurality of physical condition sensing devices distributed about the car in the most logical physical relationship to the conditions which are being monitored. They are shown, for simplicity, as a single unit in FIG. 1, this unit being connected by a conductor cable 21 to the I/O section 18 of car unit 15. The display console is similarly connected by a cable 22 to the I/O section. A two-wire multiplex line (MUX) 24 is connected to the data link and, through conventional coupling connectors at the couplings interconnecting the various cars, to other cars of the train. The basic multiplexing technique using a two-wire interconnection system to minimize the number of wires running through the couplings is generally conventional in concept and does not, in itself, constitute a fundamentally novel aspect of the invention.

It will be observed from FIG. 1 that the cars have substantially identical equipment including a display console, processing equipment and condition sensors. Some deviations from this pattern should be mentioned. First, if the cars are of different types, the number and type of condition sensors will usually also be different. For example, in the brake-sensing equipment, brakes manufactured by one organization for the transit system of a particular metropolis for train cars of a particular type generally do not exhibit the same kinds of faults and therefore do not require the same kinds of condition sensors as the brakes manufactured by a different company. Thus, different kinds of sensors would be employed. However, the sensors in themselves are conventional in nature and do not per se form a part of the present inventions.

The other major difference which can occur depends upon the different kinds of cars employed by a specific transit systems. For example, some transit system employ cars of a type which permits any of them to be used as "lead cars" in an assembled train. Each such car has a motorman's compartment, sometimes at each end of the car, and when a train is assembled, one such motorman's compartment at one end of the train is activated and upon such activation that car becomes the lead car of the train. Other transit systems, however, employ cars of this type as well as cars which do not have lead car capacity, i.e., they do not have a motorman's compartment at all. Those which can function as a lead car are commonly referred to as A-type cars and those which cannot so function are commonly designated B-type cars. It is contemplated, in the present invention, that all A-type cars would be provided with equipment as illustrated in FIG. 1, whereas B-type cars would have the same equipment except that they would not have the digital readout and display console.

Figure 2:
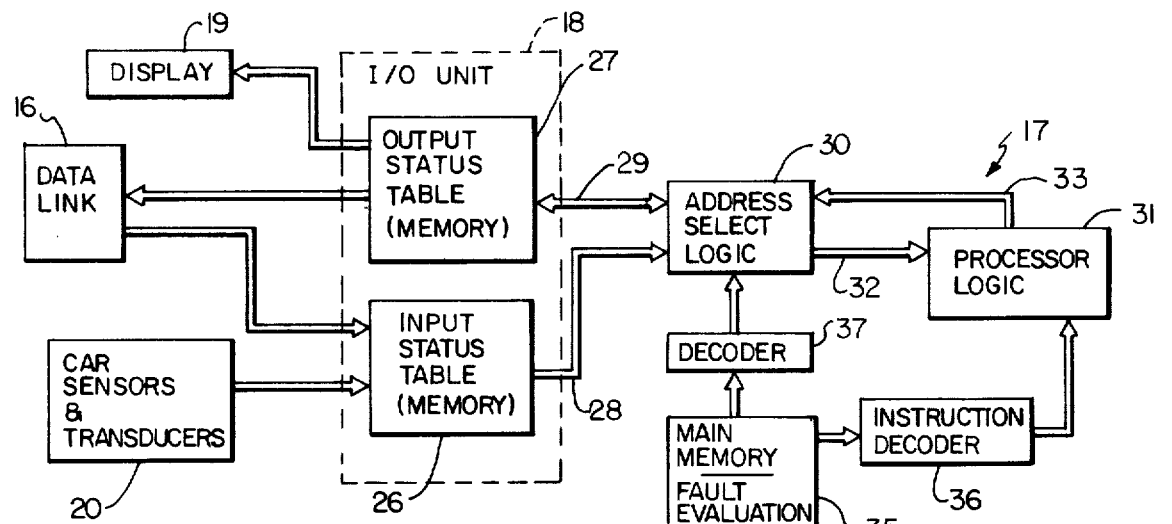
FIG. 2 is a block diagram of the apparatus on one car of a system according to FIG. 1.

The apparatus to be provided in each car, with the above noted exceptions, is shown in block diagram form in FIG. 2. As shown therein, and as to be described hereinafter, the processing equipment and I/O units contemplated for use in this invention can be industrial programmable controller equipment manufactured and sold by Industrial Solid State Controls, Inc., 435 West Philadelphia Street, York, Pennsylvania, under the designation IPC-300, or similar equipment. Programmable controllers manufactured by other companies can, however, be employed with suitable modification. The description herein will be in terms of the IPC-300 as being a particularly advantageous system for this purpose.

The data link, display and sensor units 16, 19 and 20, respectively, are interconnected through I/O unit 18 to the processing equipment 17, as previously indicated. I/O unit 18 includes two solid state random access memories 26 and 27, memory 26 being referred to as the input status table and memory 27 being identified as the output status table. Each of these status tables typically is provided with a capacity of 256 bits of information, each bit location having a specific address identifiable and correlated with a wire connection at its interface with the display, data link and sensor units. Considering first the input status table, each memory location in a designated portion of that table is dedicated to a specific kind of input function, whether a sensor or an input from the processor of another car. For example, the first 100 bit locations of table 26 can be dedicated to transducer input, specifically ones of those locations being further identified with and dedicated to specific kinds of sensors. Thus, the door sensors can be connected with locations 001–016 in table 26 and, in every car in which this equipment is installed, the door sensors would always be connected with those specific locations in the input status table. Similarly, the lighting system of a specific car, if it is to be monitored, might always be connected to inputs 024–030 in the input status table. If the lighting system is not to be monitored, those locations simply would not be used.

In similar fashion, the data link connections to other cars would be connected with locations 101–156, each of those locations being further identified and associated with a specific kind of fault to be reported by another car to the processing equipment shown in FIG. 2 if that equipment is in the lead car.

In similar fashion, the output status table is associated with certain connections in the data link unit and certain bit locations are associated with certain connections in the display unit. The actual identification of these locations is, of course, of no relevance except to a specific installation.

The input and output status tables are connected through multiple conductor cables 28 and 29 to address selection logic 30, logic unit 30 being connected to provide information to, and receive information from, a central processor logic unit 31 through multiconductor cables 32 and 33.

A main memory unit 35 provides instruction information through a decoder 36 to processor 31 and provides address selection instructions through a decoder 37 to logic unit 30. The main memory, in this system, contains instruction information to evaluate the various bits of information received from the car sensors and transducers to solve logic equations and to determine whether or not a fault condition in a given car exists. In addition, the main memory unit can include a program portion 38 which contains instructions to permit the processor to interrogate other cars in the train if the car in which the equipment is installed is to function as a lead car. The lead car functions are activated only when that car is designated as a lead car and only when a lead car key switch is operated. Clearly, only one unit in any train assembly can function as the lead car. While each unit in each car can be provided with a memory having the lead car function instructions, they simply are not employed unless the lead car key switch is operated.

Figure 3:
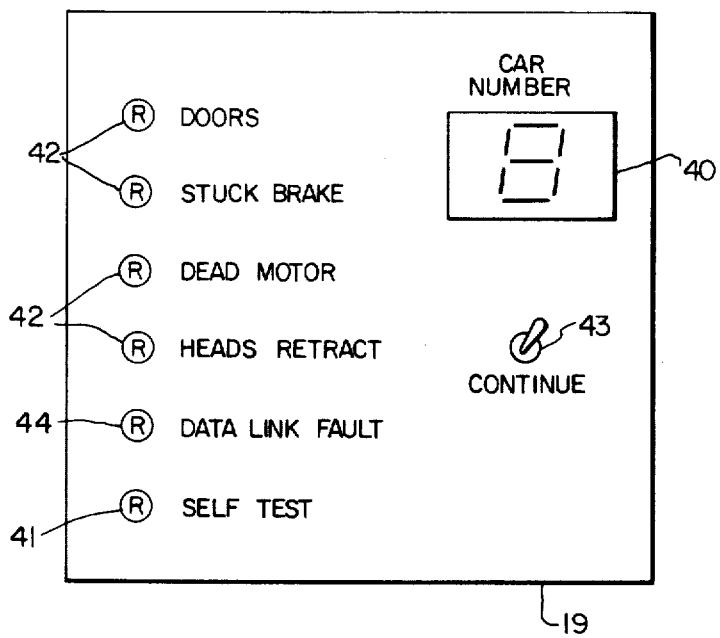
FIG. 3 is an illustration of a display panel usable in the apparatus of FIGS. 1 and 2.

A typical display panel usable as display panel 19 is shown in FIG. 3, the panel having a digital indicator and a plurality of lights which can be illuminated to indicate to the operator that a specific kind of fault exists and on which car. The digital indicator 40 is illuminated to show the car number and a self-test light 41 is illuminated, or can be made to be illuminated continuously, so long as the apparatus is operating. If no faults exist, the remaining lights remain not illuminated. If a fault does exist, an appropriate one of lamps 42 is illuminated to indicate that a fault of a specific type exists in the car identified. The display apparatus can be caused to remain with no indication portrayed unless a fault exists, at which time a car number appears in display 40 and one of lamps 42 is illuminated. After the fault has been recognized by the operator, he can actuate a "continue" switch 43, acknowledging recognition of the fault and causing the system to proceed with its continual monitoring function. Alternatively, depending upon the nature of the fault, the operator can take steps to remove the defective car from the train or to alert maintenance personnel to the fact that the fault exists and that it is of such a nature as to jeopardize the safety of the train should it continue. The precise steps to be taken are a function of the operating policies of the transit system. A "Data Link Fault" lamp 44 can also be provided.

Figure 4:
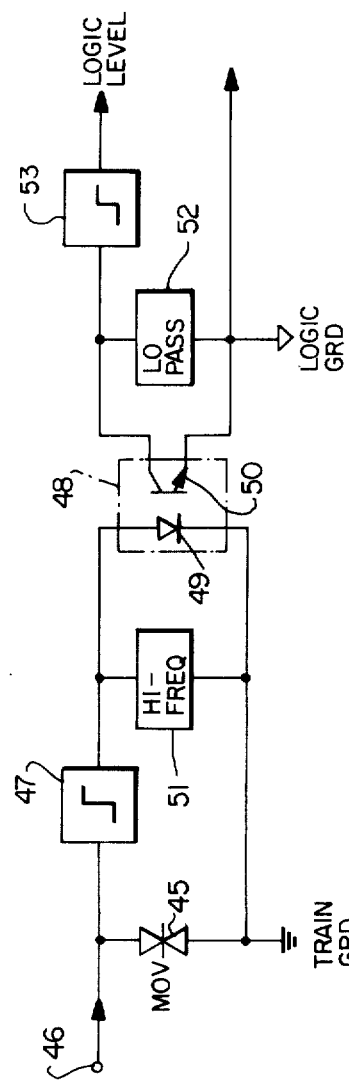
FIG. 4 is a schematic diagram of an input monitor circuit usable in the apparatus of FIG. 2.

The fault-sensing devices to be incorporated in a train generally constitutes two different types, one being a relatively simple on-off condition, such as a door switch which is either open or closed. The other type of sensor involves a variable voltage condition, the amplitude of which indicates whether or not the specific piece of equipment is operating properly. For example, a motor temperature sensor can produce a variable voltage proportional to temperature, which voltage becomes an indication of an undesirable condition when it exceeds a predetermined threshold. A typical input monitor circuit usable in a transducer of this second type is shown in FIG. 4, circuits of this type being includable in the I/O box for connection to the appropriate sensors. The input circuit receives a typical transducer-type input signal which is in the form of a voltage or current level and then translates that external signal into a logic level which can be used by the digital processing equipment of FIG. 2. Because of the high noise level imposed by a train environment on electronic systems, due both to conducted noise on power lines and input signals and also due to radiated noise from the inductive components such as the motor propulsion system, air conditioners, and the like, extreme care must be taken to eliminate the noise effect on the processing system. The input monitor circuit therefore advantageously includes a metal oxide varistor 45 connected in parallel between the input 46 and train ground to clamp high speed transients to tolerably low levels. The input signal, absent the transients, is then supplied to a threshold detector 47, the output of which is connected to an optical isolator 48 including a light-emitting diode 49, the emitted light from which is optically conducted to a photoresponsive diode or transistor 50. A high frequency filter 51 is further employed to remove specific undesirable high frequency components. The output of transistor 50 is connected to a threshold detector 53, the output of which is clamped to a logic level acceptable and recognizable by the processing equipment. A low pass filter 52 connected to the input of circuit 53 provides integration to eliminate high speed transients to prevent their being interpreted as true signals. Suitable grounding and shielding should also be provided.

The fault detection process in the system of the present invention occurs as follows. First, each car, independent of each other car, detects various signal conditions through the I/O unit from the car sensors and transducers for its own car. These various conditions do not, in themselves, necessarily indicate the existence of a fault condition in the car, but rather simply indicate the existence of certain physical conditions. The processing equipment takes the information provided by the various monitors and solves logic equations, in accordance with predetermined criteria, to determine whether or not a fault exists. When it is determined that a fault does exist, this fact is stored. More accurately, the result of the logic equation solution is stored, whether or not it indicates the existence of a fault. That result is stored in the output status table in preselected locations. The equipment in the lead car, which can be regarded as a master controller, then serves as an interrogator by following the sequences stored in portion 38 of the main memory to interrogate each car through the data link and multiplex lines to "ask" each processor in turn if it has a particular kind of fault.

In response to these interrogation signals, each logic processor responds to the master controller via the multiplex lines with an answer as to whether or not a fault exists. If a fault does exist, the master controller receives this signal and illuminates the appropriate light on panel 19 to indicate to the motorman that the fault does exist.

There are various ways in which the master controller can be programmed to ask each car about its faults. In one form, the master controller can transmit an interrogation signal which will cause each car, in turn, to respond with signals reporting any faults located up to that time in that car. In another form, the master controller can individually ask for responses about each fault in one car, going through an interrogation sequence about fault type 1, then type 2, etc., alternatively, the master controller can be programmed to repetitively and sequentially interrogate one car at a time as to its fault condition. In this form, it starts with car No. 1 (the lead car itself), interrogating its own processor about the existence of a specific fault and then proceeds through each car asking about that particular fault. It then goes on to another type of fault condition and queries each as to its state. The system would then be designed to continually cycle through each type of fault condition on a looping basis.

The manner in which the above is accomplished can be more clearly understood by specific example. Consider first the process of monitoring the door condition. Door condition is particularly important in an urban transit system in which the doors are opened and closed very frequently. Door command wires in a typical kind of train car are referred to as the "open wire" and the "unlock wire", signals on these driving the door-operating mechanisms. When these two wires are not energized, the doors should be closed. Each door-operating mechanism actuates a normally open limit switch when the door is closed. These limit switches are connected in series circuit relationship to a wire referred to as the "S wire" which is connected to a solenoid. When all of the doors are closed, the solenoid is energized closing a contact which provides an illuminated motorman's indication, apart from the present system, in the lead car to indicate that all of the doors are closed.

There are two specific types of door problems which are important to detect and which can be detected easily by the present system. The first one of these is when the doors are commanded closed but one or more remain open or partially opened. The second problem is when the doors are actually closed but the motorman's indication does not come on because the solenoid contact failed to close. These two types of problems can be monitored by observing the voltages at five specific points, these being the open wire voltage, the unlock wire voltage, the S wire voltage, a voltage VA on the wire leading to the motorman's "closed door" indication, and a voltage VB on the other side of the solenoid contact from voltage VA. The first type of fault described above can be detected by noting that when the "open wire" is not energized, the unlock wire is not energized and a door is still open, the S wire will not be energized. A Boolean equation representing this fault can therefore be written as follows:

$$FAULT\ 1 = (\overline{S})(\overline{OPEN})(\overline{UNLOCK}) \quad \text{Eq. 1}$$

However, since a delay occurs from the time the doors are commanded closed until they actually close, an appropriate time delay should be incorporated. The equation then becomes:

$$FAULT1 = (\overline{S})(\overline{OPEN})(\overline{UNLOCK})(ON\ delay\ No.\ 1) \quad \text{Eq. 2}$$

The equation for the second kind of fault can be written by noting that when the "S wire" is energized, the solenoid contact should be closed and thus voltages VA and VB should be equal. If these voltages are not equal, a fault exists. Again, there is a delay involved from the time a relay is energized until its contact closes. Accounting for this delay, the second type of fault can be represented as follows:

$$FAULT\ 2 = (S)(VA\ \overline{VB} + \overline{VA}\ VB)(ON\ delay\ No.\ 2) \quad \text{Eq. 3}$$

The results of these two equations can then be subjected to a logical OR operation to produce a resulting indication of whether or not a fault exists, i.e., there is a door fault if either kind of fault exists, and this should be indicated. The overall door fault relationship is therefore represented as follows:

$$DOOR\ FAULT = FAULT\ 1 + FAULT\ 2 =$$
$$(\overline{S})(\overline{OPEN})(\overline{UNLOCK})(ON\ delay\ No.\ 1) + (S)(VA$$
$$\overline{VB} + \overline{VA}\ VB)(ON\ delay\ No.\ 2) \quad \text{Eq. 4}$$

It will be noted that, in standard logic equation terminology, the expression (A)(B) is read "A AND B", and A+B means "A OR B", the "AND" and "OR" being logic gate operations.

Figure 5:
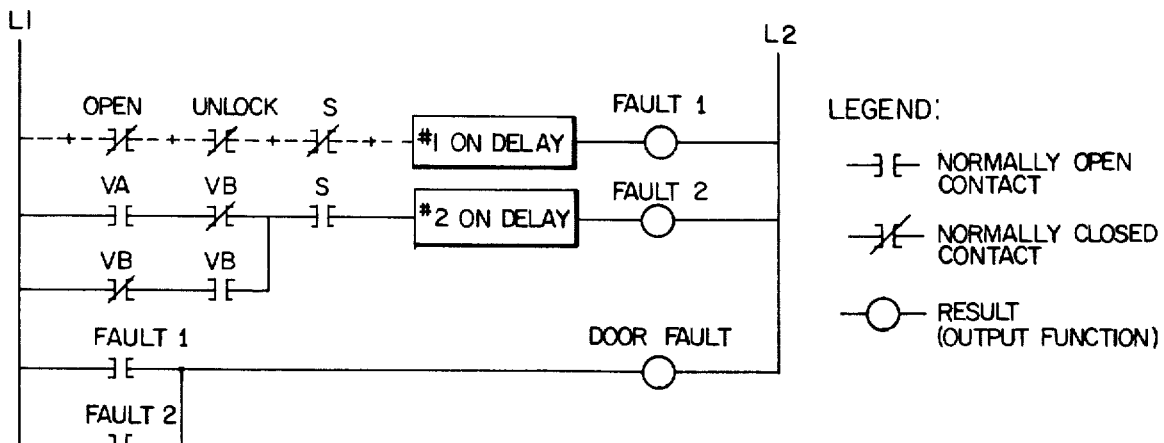
FIG. 5 is a typical ladder diagram used with the present invention in fault detection.

The previously mentioned IPC-300 controller employs relay ladder logic, permitting these equations to be implemented in such logic as shown in FIG. 5. It will be seen in this figure that the above equations are simply implemented in a form using normally open and normally closed contacts, each of equations (2) and (3) being solved individually to arrive at an output subfunction represented by the circular symbols identified as fault 1 and fault 2. These output functions can be regarded as relay windings, contacts of which are closed if a fault exists. These contacts, identified as fault 1 and fault 2, are then connected in a further ladder to determine whether or not a door fault exists.

In actuality, relays are not employed. Instead, a portion of the output status table 27 is devoted to storage of subfunction results such as the fault 1 and fault 2 results shown in FIG. 5. The program then looks at these to see whether a positive indication of a fault is present, i.e., a logic 1. If so, this is interpreted as being a closed contact and is fed back into the ladder diagram to result in a door fault indication which is then stored in the output status table as a true fault indication.

The door fault output then represents the aggregate fault for the faulted car and is reported to the No. 1 or lead car for display via the data link. It will be observed that either of the individual faults could be reported, but this approach tends to overly complicate the display panel.

As will be indicated hereinafter, the existence of these faults can be counted for subsequent analysis, this technique being particularly helpful when the faults are of a transitory nature.

As a second example of fault analysis, the problem of a stuck brake will be considered. In a typical train car, there is provided a subsystem to control brake pressure, a block diagram of a system of this type being shown in FIG. 6. As shown therein, a P wire is connected in series with the various brakes of a car to transmit to the brakes a control signal to alter the brake pressure. This control signal, which is supplied by standard equipment in the car, is supplied to a current-to-voltage converting amplifier 75, the output V1 of which is applied to one input of a differential amplifier 76. A dynamic brake effect also occurs in the motors of an electrically driven train car and the motor current is therefore monitored and supplied to a current-to-voltage converting amplifier 77, the output of which is connected through a summing resistor 78 to the other input of differential amplifier 76. The brake pressure is monitored by a pressure transducer 79 which supplies a feedback signal through a summing resistor 80 to be summed with the signal through resistor 78 and applied to the second input of amplifier 76 as a voltage VS. The output of amplifier 76 is applied to the brake pressure applying device 81 which actuates the brakes. Thus, the dynamic brake signal and the feedback signal are summed and the resultant is compared with the "P wire" signal. When the P wire signal calls for a change in brake application, the comparison of V1 and the sum voltage VS will be unbalanced, causing the output of differential amplifier 76 to change the brake pressure until the two voltages are again equal. By monitoring V1 and VS, one can determine if a brake is stuck. The voltage V1 is threshold detected, as by the circuit shown in FIG. 4, to determine when it calls for full brake release. The voltage VS is also threshold detected to determine if any brake pressure greater than "snow" brake pressure is applied. If V1 calls for full release while the VS still shows greater than snow brake pressure, then a stuck brake fault is present. Thus, with response time taken into account, the equation for a stuck brake fault is as follows:

$$STUCK\ BRAKE\ FAULT = (FULL\ RELEASE)(BRAKE\ PRESSURE)(ON\ delay) = (V1\ release\ threshold)\ (VS\ Snow\ brake\ threshold)\ (ON\ delay) \quad \text{Eq. 5}$$

Figure 6:
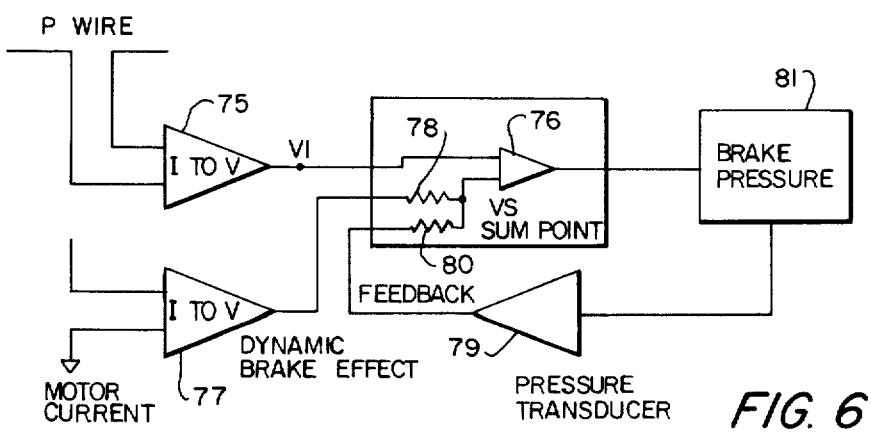
FIG. 6 is a transducer circuit usable in the system of FIGS. 1 and 2.

It is also possible to monitor the supply voltages to the circuit shown in FIG. 6 and to indicate a fault if these voltages drift beyond a predetermined tolerance. The circuit normally requires ±15 volt supplies and a tolerance of ±0.5 volts can easily be detected. Thus, the total brake fault condition which would be reported is represented by the following logical relationship:

$$BRAKE\ FAULT = STUCK\ BRAKE + SUPPLY$$
$$VOLTAGE\ OUT\ OF\ TOLERANCE \quad \text{Eq. 6}$$

Again, either or both of these individual faults could be programmed to be reported to the operator display, if desired. Also, either one or both of these faults can be counted and stored in the individual car monitoring unit for display for preventative or corrective maintenance.

In this connection, a plurality of counting means 39 are coupled to the fault storage portion of status table 27, one counter per fault type, to enter a count each time a fault is found. The counter means can be storage locations in the main memory in which binary representations of the counts are stored, or they can be separate read or other counting devices. For simplicity they will be referred to as counters herein. These counters do not reset themselves, but simply continue to count up faults until they are manually reset. In addition, it is desirable to connect the counters so that they count not only those faults which are reported to the motorman (e.g., "BRAKE FAULT") but also the interim fault solutions (e.g., "STUCK BRAKE" and "SUPPLY VOLTAGE OUT OF TOLERANCE").

This permits greatly improved and efficient maintenance procedures. When a car is delivered to a maintenance yard, the maintenance personnel can connect a counter reader to the counters and obtain a readout of the number of times each fault has occurred since the last maintenance procedure, and of the specific area in which the fault has occurred. This is particularly helpful in locating and correcting problems which are transitory in nature, i.e. those which occur from time to time but which are not in evidence when the car is taken to the maintenance facility.

A unit which is commercially available and which is particularly suitable for this purpose is a Program Monitoring Unit manufactured by Industrial Solid State Controls, Inc., of York, Pennsylvania. This unit is provided with a paper tape printer and addressing means for addressing any counter or timer value in memory. The operator thus can address each relevant memory point and obtain a permanent printed record of the storage location for each fault type and the number of times the fault has happened, which information can then be used to guide maintenance procedures and to build a permanent record of fault history for redesign and other purposes.

Another example of a fault which can be monitored by the system is a dead motor fault which involves the monitoring of four wires to determine whether the motors of a car should be active. A relay is normally provided to sense the loss of the "third rail" supply which is usually 600 volts. The motors can draw current only during the time this relay is closed indicating that the 600 volts is present. The relay is, in some systems, referred to as the PTR relay. Forward movement is called for when three other wires, referred to as the No. 1, No. 6 and GS wires, are energized. Reverse movement is called for when the No. 2, No. 6 and GS wires are energized. During the time that movement is called for and the PTR relay is closed, if there is no motor current, it can be concluded that a dead motor fault has been detected. Incorporating a factor to allow for the PTR and motor current response times, the logical equation to detect a dead motor fault can be written as follows:

$$DEAD\ MOTOR = (PTR)(No.\ 1 + No.\ 2)(No.\ 6)(GS)(MOTOR\ CURRENT)(ON\ delay) \quad Eq.\ 6$$

The retraction or extension of the coupler heads can also be easily monitored. To determine if a coupler head is retracted, it is convenient to simply monitor a contact in each head which, when closed, indicates that the head is fully extended and locked. Only the No. 1 end of the two end cars should have retracted heads. All other heads should be extended and locked.

It will be seen from the above that logic equations can be written for any fault condition to be detected, the fault conditions being by no means limited to those described above. Having written the logic equations, the solution of them can be solved either by a system based on Boolean algebra or by the ladder network approach, the latter being the system employed by the IPC-300. The logic processor of the IPC-300 contains the processing logic, a read/write memory, power supplies and interface circuitry to the input and output sections and the data link. The logic processor can be regarded as being similar in function to a special purpose microcomputer in that it can solve logic equations which are programmed into its memory. The logic processor sequences through its memory one word at a time. As each word is read, the instruction in that word is decoded by decoder 36 and, according to the decoded instruction, an operation is performed by the processor. A typical operation might be to examine the status of a logic signal coming into the processor from an input monitor unit. Logic operations such as "AND", "OR", "ADD", "SUBTRACT", "STORE", "COMPARE", "TIME DELAY", and "DIGITAL COUNTERS" can be performed by the processor as programmed into the memory. Thus, the logic processor is general purpose in that it can be programmed according to the user's needs. The size of the program which can be run by the processor is limited only by memory capacity which can conveniently be 2,048, 4,096 or 8,192 eight-bit words, as required by the size and complexity of the train system.

Clearly, instructions can be altered by the user as required without deleting or adding hardware.

As indicated, the memory can also be used to store and count the number of times a fault has occurred. When the logic processor solves an equation to determine if a fault condition has occurred, the master control is alerted, as previously described, but in addition that fault is stored in a memory location. Each time the fault occurs it is counted and the added result is stored in memory. The solid state memory can be provided with its own battery system so that if train power is removed, the battery will power the memory so that its data is not lost.

The sequence of operation of an apparatus according to the invention begins with the energization of the system which commences the sequencing of the operational program stored in the main memory 35. The first part of the operation is identical for each piece of equipment in each car, except for differences in the faults being reviewed, depending upon the type of car as previously described. The operation commences with the operation program in the main memory which sends a command, decoded by decoder 37, to read all inputs. The inputs are then read into the input status table 26 which then temporarily stores all of the inputs in the form of a series of ones and zeros. This is done at the beginning of every memory scan. The processor logic then begins to execute the program in the main memory. The first ladder in the main memory is then examined, at which time the appropriate bits of information stored in the status table are chosen and the first ladder network equation is solved, the processor logic going through the various logic operations, i.e., AND or OR operations or the like. The processor presents an output, indicating a fault or no fault and records that output at an appropriate address in the output status table. It is, of course, stored in binary form. This can be a final result or it can be an interim solution as in the case of the fault 1 and fault 2 conclusions discussed with reference to FIG. 5. Having solved the first ladder equation, the program then sequences to the next ladder equation and examines that equation to determine the existence of a fault, presenting an output at the result of that operation. The processor proceeds in this fashion through each ladder stored in the main memory, until the logic equations for all faults for the car have been reviewed and the results stored in the output status table.

As mentioned, a portion of the output status table can be used for interim solutions and another portion thereof for the storage of fault indications of a type which are to be transmitted to the lead car for display to the motorman. At this stage, if the apparatus is not in a lead car, the program begins over again, sequencing through each ladder in the ladder diagram and solving the logic equations, updating the output status table at the conclusion of each one. The memory would, most likely, be provided with the "lead car" or master controller program, permitting that car to be selected as a lead car, but that portion of the program would simply not be activated.

If the apparatus is in a lead car and is therefore the master controller, at the conclusion of a review of the fault ladders in the lead car itself, the remainder of the program would be activated, sequentially interrogating the output table of each car for each fault. The first step is for the program to provide an output signal to the output status table with an address for a specific car, this output being coupled to the data link and transmitted to the data link unit of the next car, in series. Each car is interrogated, first, for the first fault and, after each car has been so interrogated, each car is interrogated for the second fault. In each case, the address and message in a serial code is transmitted through the data link to the input portion of the next car I/O unit, causing the unit to respond with a message containing the fault data on fault No. 1. This fault data is then returned to the input status table of the lead car controller and, if the message contains information that a fault exists, a display is illuminated indicating to the motorman that a fault in a specific car exists. Absent a fault indication, the program continues, fault by fault and car by car, to sequentially and repetitively interrogate each controller. Upon conclusion of this portion of the program, the fault review is recommenced.

With the specific apparatus referred to herein, the message format used in the data link begins with a message identifier. This first character can take a large number of forms, but only three types of message identifiers are used in the system as presently described. A "load data" identifier tells the car receiving the message to load the following data characters into its data link memory. A "report data" identifier tells the car receiving the message to send back any faults detected in that car. A "fault report" identifier tells the master controller that the addressed car is reporting fault data, as requested.

The second character of the message is the car number character, identifying the car which is to receive the transmission. With a seven bit ASCII code word, a maximum of 128 cars can be addressed. In the car addressing scheme, the master controller sends a message to the cars identified in the number. The message is received by each car beginning with the master which is identified as car No. 1. All cars are numbered successively, increasing in number away from the master controller. Each car receives the message, the cars being connected in series, and according to the message identifier will act on the address character by subtracting one bit from the address code if the message identifier is either "load data" or "report data ". After one decimal value is subtracted from the address, a check for zero result is made. If the result is zero, that car is the addressed car. If the result is not zero, the entire message is retransmitted to the next successive car until the zero checked car is reached. The addressed car will then receive the entire message and take appropriate action.

If the message identifier is "fault report", then each car will transmit the message to the succeeding car in a direction toward from the lead car. The master controller will ultimately receive the fault report identifier and recognize it as such by decoding the first character of the entire message block. The third character of the message is the address character for data storage, this character containing the starting address code for the data link memory locations within the receiving data link unit where the data is to be loaded into or from which it is to be reported. With the memory capacity described, 256 memory address locations each containing one data bit is the contemplated capacity of the system.

The next three characters of the message are data bytes 1, 2 and 3, which can exist in either the "load data" type of message or the "report fault" message. In either case, these data bytes contain the data (either commands or fault reports) to be loaded in the addressed data link memory locations in accordance with the third message character. In the report data message, the data bytes contain dummy information. Although three 7-bit characters are used for data transmission, where each bit corresponds to a reported fault condition, the number of data characters can be expanded according to the number of fault reports required for a specific operating system.

The last portion of the transmitted message is the checksum which is simply a longitudinal parity or error detection word for checking the validity of the six previous characters. The checksum, in conjunction with the parity bit in each word is used to check for transmission errors in the message block.

The above description has been set forth on the basis of a seven bit code word for the message itself. In addition to this, a start bit is provided at the beginning of each portion and a parity bit and two stop bits are provided at the end, constituting a standard 11-bit word.

Figure 7:
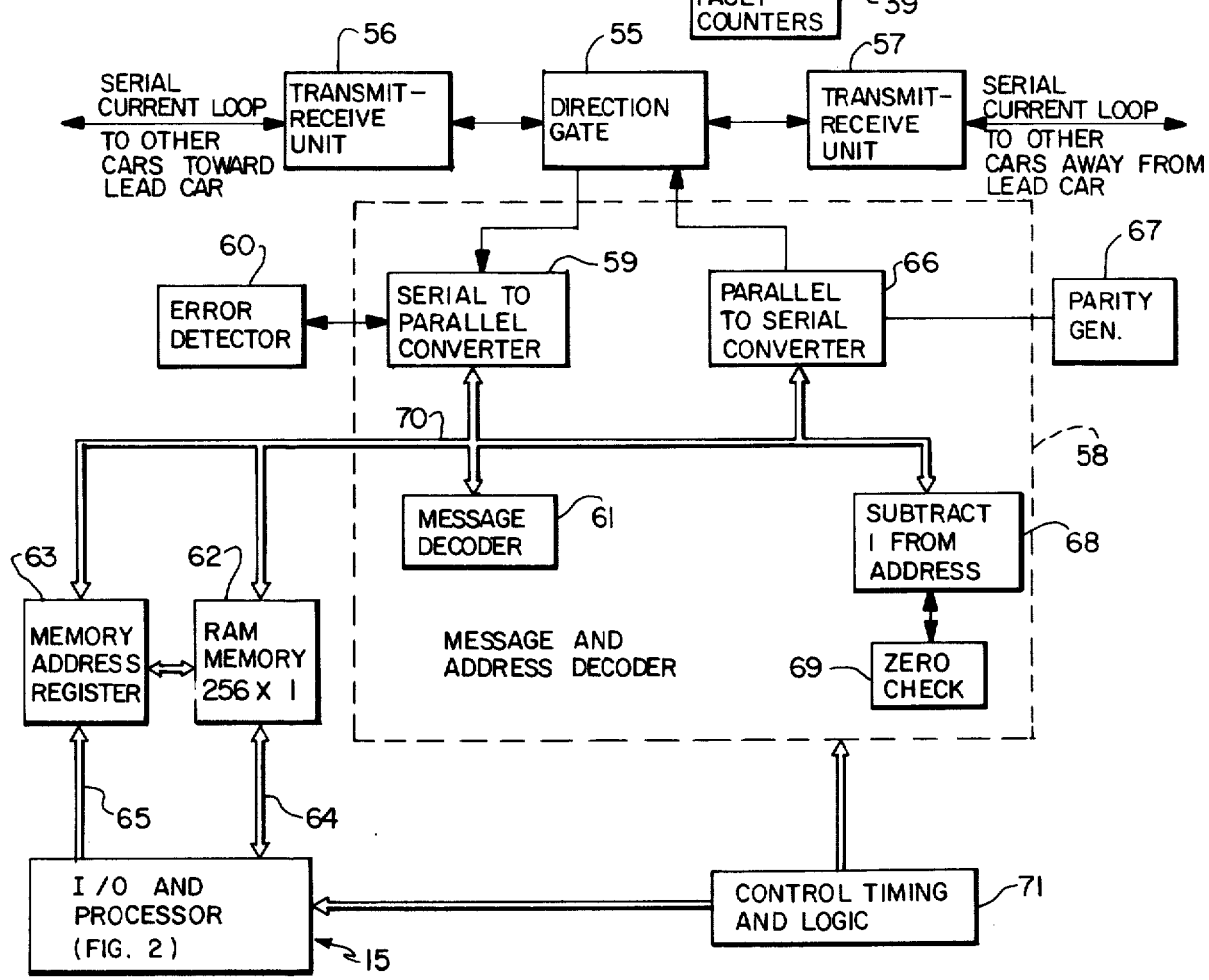
FIG. 7 is a block diagram of a data link unit usable in the apparatus of FIG. 2.

A functional block diagram of data link apparatus usable in the system of the present invention is shown in FIG. 7. A direction gate 55 includes logic to channel signals in the appropriate direction from any unit toward one end of the train or the other, depending upon the nature of the message being handled. The direction gate is bidirectionally connected with two transmit-receive units 56 and 57, these being serially connected with the direction gate in a series current loop with the units in the other cars. The transmit-receive units contain logic to receive and send current loop signals at levels of, for example, 20 or 60, milliamperes and translate these current pulse signals to voltage type signals having suitable voltage logic levels, e.g., at 5 volts. The transmit and receive units can include a commercially available device known as a universal asynchronous receiver-transmitter (UART) and other logic to effect the pulse form translation and handle the signals to and from the direction gate. Units 56 and 57 can also be employed to accomplish a parity check on each character sent, using the parity bit provided at the end of the character.

Direction gate 55 is connected to transmit and receive signals to and from a message and address decoder 58 which includes a serial-to-parallel converter 59 which receives the digital signals in serial form from the direction gate and converts them to parallel form. An error detector 60 can be coupled to converter 59 to detect parity errors. Converted signals are supplied to a message decoder 61 which is capable of decoding and recognizing those signals on which the processor is to act. The decoder then provides decoded message information to a random access memory 62 and a memory address register 63, register 63 being provided to recognize an address and properly direct it to the appropriate addressed location in memory 62. Memory 62 communicates bidirectionally with the I/O equipment in the apparatus described with reference to FIG. 2 through multiple communication line 64, and data to be stored in memory 62 after processing are appropriately addressed by signals to register 63 on a bus 65.

Data to be read out of memory 62 can be supplied to the parallel to serial converter 66 for coupling to the direction gate and transmission in the appropriate direction along the serial current loop. A parity generator 67 is coupled to converter 66 to supply the parity bits for outgoing messages.

An address recognition unit includes a "subtract 1 from address" unit 68 and a zero check register 69. As previously indicated, the message format is such that each message includes an address portion having a number in binary form representative of a decimal number corresponding to the number of the car. As each unit receives a message, the address portion thereof is supplied to unit 68 which subtracts a binary number representative of the decimal value 1 from that address. The resulting binary number is then checked to see if it is equal to zero. If so, the message is recognized as being intended for that car, and if not, the message is again put in serial form and retransmitted to the next succeeding car wherein the same substraction and examination process is accomplished. It will be recognized that the retransmitted address in the message represents a decimal value of one less than the message which was received by any specific unit.

Interconnection between units 59, 61, 62, 63, 66 and 68 is generally bidirectional or multidirectional between various units and is indicated generally by a connection bus 70.

A control timing and logic unit 71 is also provided, but this is also conventional in nature and will be further discussed. The function thereof is to provide the clock and other timing pulses and control functions to assure correlative operation between the various units of the equipment. Microprogram control with read only memory function can be employed in unit 71.

Memory 62, while shown in FIG. 7 as being an independent memory in the data link can, alternatively, be part of the input or output status tables in the I/O unit of the processor. The choice of whether to use part of the processor memory functions or to provide a separate data link memory depends upon memory capcacity and the number of functions to be handled by the equipment.

It will be recognized from this description that control functions in individual cars can be accomplished using basically the same equipment as that disclosed herein. For example, messages described herein as "LOAD DATA" command can contain control orders to one or more cars to energize or deenergize systems in a car such as lighting, air conditioning or the like. Outputs to activate such systems can be taken from the output status table to operate suitable drive circuits to respond to the control orders.

While certain advantageous embodiments have been chosen to illustrate the invention, it will be understood by those skilled in the art that various changes and modifications can be made therein without departing from the scope of the invention as defined in the appended claims.

What is claimed is:

1. A monitoring and reporting system for use on a vehicle having a plurality of interconnected cars including a lead car and at least one other car, comprising sensor means in each of said cars for monitoring a plurality of physical conditions in said cars and for altering circuit conditions to represent the state of said physical conditions;

means in each of said cars connected to said sensor means in the same car for repetitively and sequentially detecting each of said circuit conditions and for producing a digitial signal having a value representative of the state of each physical condition;

means in each of said cars for evaluating said digital signals in accordance with predetermined criteria to produce and repetitively update a set of second digital signals having values representative of the existence or nonexistence of faults in said physical conditions;

first memory means in each of said cars for storing said set of second digital signals;

circuit means interconnecting said cars for transmission of digital signals;

logic means in said lead car for repetitively and sequentially sending interrogation signals individually to said first memory means in each of said cars, including said lead car, to determine the existence of faults;

means in each of said cars responsive to said interrogation signals for transmitting status signals representative of said second digital signals to said lead car to provide fault information to said lead car; and display means in said lead car for receiving and storing said status signals and for providing a visual display of fault conditions reported in said status signals.

2. A system according to claim 1 wherein said means for detecting includes means for receiving condition signals representative of each of said circuit conditions and for converting each of said conditions signals into digital form; and second memory means for storing said signals in digital form.

3. A system according to claim 2 wherein said means for evaluating includes third memory means for storing an instruction program to control the reception of said conditions signals by said means for receiving, and for storing said predetermined criteria; and data processing means for sequentially receiving said digital signals from said second memory means, for evaluating said signals digital in accordance with said criteria, and for providing said second digital signals to said first memory means.

4. A system according to claim 3 wherein said display means includes a display panel having a digital numerical display and a plurality of lamps, each of said lamps being visually identified as being related to a predetermined type of fault; and logic means for selectively changing the state of illumination of an appropriate one of said lamps to indicate the existence of a fault of the type represented by that lamp and for simultaneously displaying on said numerical display a number identifying the car in which said fault is reported to exist.

5. A system according to claim 3 wherein said circuit means includes multiplex circuit means in each of said cars for bidirectionally sending and receiving serial digital current signals; and means for serially interconnecting all of said multiplex circuit means.

6. A system according to claim 5 wherein said multiplex circuit means includes logic means for receiving said digital current signals and converting said digital current signals into serial voltage level digital signals, and for converting voltage level digital signals into serial digital current signals for transmission to other cars.

7. A method of monitoring functions in a train system of the type having plural cars wherein each car is provided with a plurality of condition sensors capable of providing electrical outputs representative of specific physical conditions in the car, comprising the steps of sequentially and repetitively examining the output of each sensor in each car and digitially storing in each car values representative of the physical conditions sensed in that car;

evaluating selected ones of the stored values, singly and in groups, in accordance with predetermined criteria to determine the existence of fault conditions in each car as defined by the criteria;

storing in each car digital signals representative of the fault conditions in that car;

sequentially and repetitively interrogating, from a selected one of the cars, the stored signals representating the fault conditions in each car, including the selected one of the cars;

storing, in the selected car, the responses to the interrogating; and visually displaying in the selected car the existence of a fault and an identification of the car in which the fault exists.

8. A method according to claim 7 and further comprising the step of counting the number of times each type of fault is determined to have occurred in each car.

* * * * *